(12) United States Patent
Hefetz

(10) Patent No.: US 7,557,352 B2
(45) Date of Patent: Jul. 7, 2009

(54) METHODS AND SYSTEMS FOR CONTROLLING MEDICAL IMAGING

(75) Inventor: Yaron Hefetz, Herzeliya (IL)

(73) Assignee: GE Medical Systems Israel, Ltd., Tel Aviv (IL)

( * ) Notice: Subject to any disclaimer, the term of this patent is extended or adjusted under 35 U.S.C. 154(b) by 170 days.

(21) Appl. No.: 11/445,995

(22) Filed: Jun. 2, 2006

(65) Prior Publication Data
US 2007/0278411 A1 Dec. 6, 2007

(51) Int. Cl.
*G01T 1/166* (2006.01)
*G01T 1/20* (2006.01)

(52) U.S. Cl. ................................. 250/363.04
(58) Field of Classification Search ............... 250/208.1, 250/363.04
See application file for complete search history.

(56) References Cited

U.S. PATENT DOCUMENTS

| | | | | |
|---|---|---|---|---|
| 4,593,189 A | * | 6/1986 | Stoub | 250/221 |
| 5,319,205 A | * | 6/1994 | Kline et al. | 250/363.04 |
| 5,376,796 A | * | 12/1994 | Chan et al. | 250/363.04 |
| 5,465,284 A | | 11/1995 | Karellas | |
| 5,486,700 A | * | 1/1996 | Silberklang et al. | 250/363.04 |
| 5,596,197 A | * | 1/1997 | Jones et al. | 250/363.04 |
| 5,629,971 A | * | 5/1997 | Jones et al. | 378/145 |
| 6,031,892 A | | 2/2000 | Karellas | |
| 6,909,097 B2 | | 6/2005 | Schreiner et al. | |
| 2004/0008810 A1 | | 1/2004 | Nelson et al. | |

* cited by examiner

*Primary Examiner*—David P Porta
*Assistant Examiner*—Mark R Gaworecki
(74) *Attorney, Agent, or Firm*—The Small Patent Law Group; Dean D. Small

(57) ABSTRACT

Methods and systems for controlling medical imaging are provided. A proximity sensor arrangement for an imaging system is provided. The proximity sensor arrangement includes at least one light emitter and at least one light detector. The proximity sensor arrangement further includes at least one reflector configured to reflect light waves from the at least one light emitter to the at least one light detector to form at least one light path to determine a proximity to the at least one imaging component of the imaging system.

27 Claims, 13 Drawing Sheets

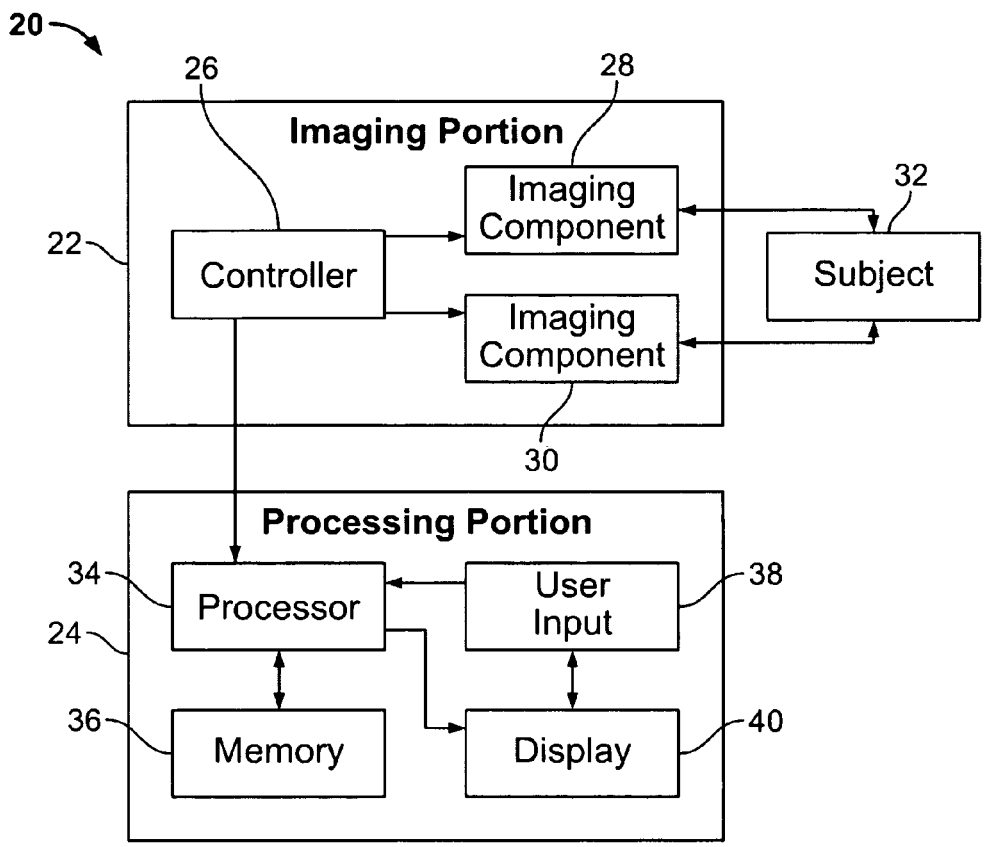
FIG. 1
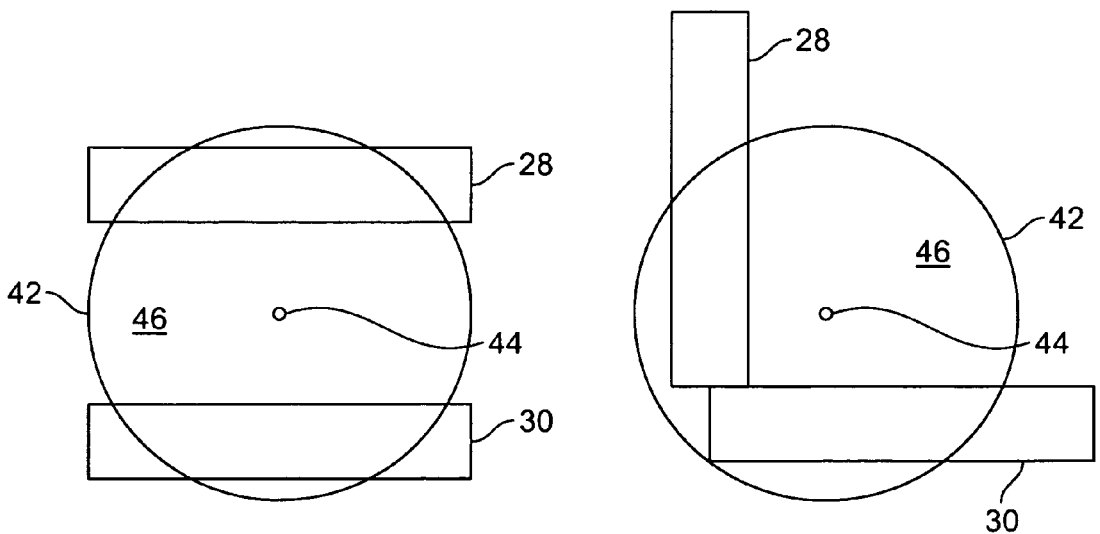
FIG. 2
FIG. 3

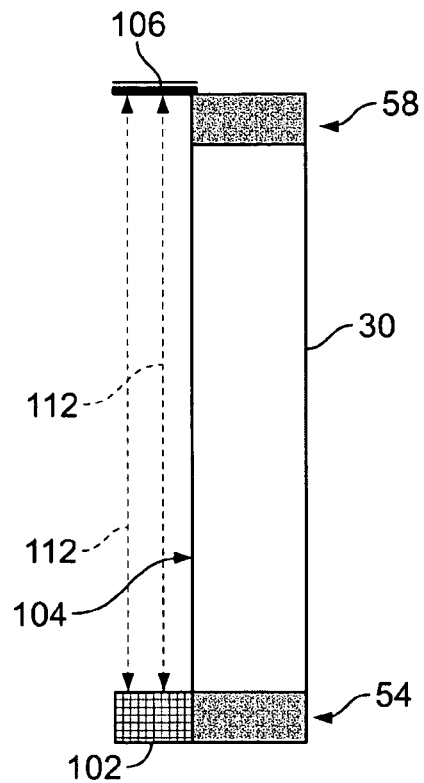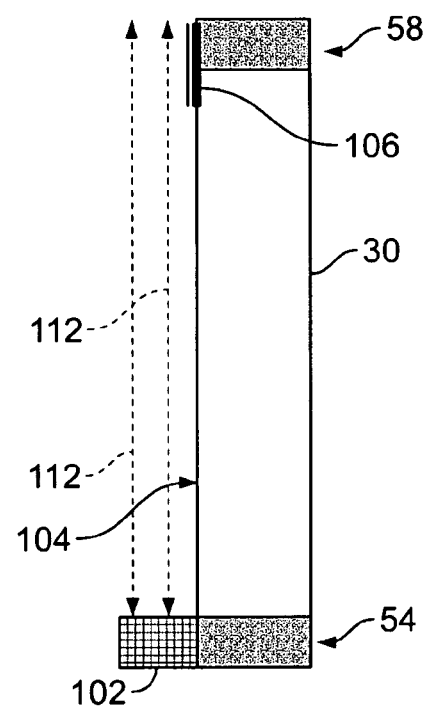
FIG. 10     FIG. 11

METHODS AND SYSTEMS FOR CONTROLLING MEDICAL IMAGING

BACKGROUND OF THE INVENTION

This invention relates generally to medical imaging systems, and more particularly, to methods and systems for controlling the positioning of imaging portions of medical imaging systems.

Medical imaging systems are used to perform different types of diagnostic imaging. For example, diagnostic nuclear imaging is used to study radionuclide distribution in a subject, such as a patient. Typically, one or more radiopharmaceuticals or radioisotopes are injected into the subject. Gamma camera detector heads, typically including a collimator, are placed adjacent to a surface of the subject to monitor and record emitted radiation. At least some known gamma camera detector heads are rotated around the subject to monitor the emitted radiation from a plurality of directions. The monitored radiation data from the plurality of directions is reconstructed into a three dimensional image representation of the radiopharmaceutical distribution within the subject. This three-dimensional imaging is known as Single Photon Emission Computed Tomography (SPECT).

Generally, the resolution of a gamma camera degrades with increasing distance between the imaged subject, and in particular, the imaged organ and the detector. Therefore, it is desirable to place the gamma camera as close as possible to the subject to facilitate minimizing the loss of resolution. At least some known imaging systems use non-circular orbits, such as oval or elliptical orbits to facilitate maintaining the detectors positioned close to the patient during a scan. However, this type of imaging still does not always provide optimal or close scanning and image resolution degrades.

When the imaging system is configured, for example, with a pair of gamma cameras at substantially 90 degrees to each other in what is commonly known as L-mode, which is done when imaging the heart, and other organs, the gamma cameras are configured such that the gamma cameras essentially contact one another along adjacent edges. Typical gamma cameras comprise a large scintillation crystal of NaI optically coupled to an array of Photo-Multiplying Tubes (PMTs). Signals from the array of PMTs are processed to yield the location of the scintillation event on the crystal in what is known as "Anger" camera. Because of this construction, the gamma camera is less responsive near an outer periphery of the detector. The gamma camera detector is typically sized larger than the viewing area, and a volume of missing data results in the area proximate a surface of each detector where the volume is "seen" from only one of the detectors. Generally, the body of the patient is maintained spaced away from the surface of the detectors to avoid "missing data" that causes artifacts in the reconstructed image.

It is also known to use proximity sensors in order to position the gamma cameras, for example, close to a subject being imaged. An exemplary proximity sensor arrangement is illustrated in U.S Pat. No. 5,486,700. However, in the L-mode of operation, the proximity sensors can cast shadows during imaging that also results in missing data because, for example, the patient is positioned farther away from one of the gamma cameras than the other gamma camera. In a different camera configuration, wherein the two nuclear detector heads are substantially parallel to each other in what is commonly known as H-mode, a patient table (that is detected by one of the proximity sensors) often causes the patient to be positioned further away from one of the gamma cameras than the other gamma camera. Further, because multiple proximity sensors that are typically expensive are used, for example, on each of opposite ends of the gamma cameras, the overall cost of the imaging system also increases.

In operation, some types of imaging procedures yield better performance in H-mode while others yield better performance in L-mode. For example, bone SPECT is usually performed in H-mode, which cardiac imaging is routinely performed in L-mode. Accordingly, some dual head gamma camera systems are constructed in a fixed H-mode, some in a fixed L-mode and some having a flexible configuration in which at least one camera head cane be rotated relative to the other camera head such that the system can be configured in both the L-mode and H-mode. In any mode of operation, the image quality obtained by a gamma camera is severely degraded as the distance between the detector head and the patient increases.

BRIEF DESCRIPTION OF THE INVENTION

In one embodiment, a proximity sensor arrangement for an imaging system is provided. The proximity sensor arrangement includes at least one light emitter and at least one light detector. The proximity sensor arrangement further includes at least one reflector configured to reflect light waves from the at least one light emitter to the at least one light detector to form at least one light path to determine a proximity to the at least one imaging component of the imaging system.

In another embodiment, a nuclear medicine imaging system is provided that includes a first gamma camera detector, a second gamma camera detector, and a proximity sensor connected to each of the first and second gamma cameras. The proximity sensor includes a reflector configured to reflect light waves to determine the proximity of the first and second gamma cameras from an object to be imaged.

In yet another embodiment, a method of controlling the positioning of imaging components of a medical imaging system is provided. The method includes emitting light waves from a first side of a first imaging component and reflecting the emitted light waves to one of the first side of the first imaging component or a second side of a second imaging component. The method further includes positioning the first and second imaging components based on whether the light waves are blocked or unblocked.

In still another embodiment, an optical light path generated within a medical imaging system is provided. The optical light path includes an emitted light wave and a reflected light wave. The emitted light wave and the reflected light wave are configured to determine a proximity of an imaging component of the medical imaging system to an object to be imaged.

BRIEF DESCRIPTION OF THE DRAWINGS

FIG. 1 is a block diagram of an imaging system constructed in accordance with various embodiments of the invention.

FIG. 2 is a block diagram illustrating imaging components of the imaging system of FIG. 1 is an H-mode configuration.

FIG. 3 is a block diagram illustrating imaging components of the imaging system of FIG. 1 is an L-mode configuration.

FIG. 10 is a side elevation view of a portion of the imaging system of FIG. 1 configured as a nuclear medicine imaging system in an H-mode configuration illustrating a proximity sensor arrangement in accordance with another embodiment of the invention.

FIG. 11 is a side elevation view of a portion of the imaging system of FIG. 1 configured as a nuclear medicine imaging system in an L-mode configuration illustrating a proximity sensor arrangement in accordance with another embodiment of the invention.

DETAILED DESCRIPTION OF THE INVENTION

Figure 4:
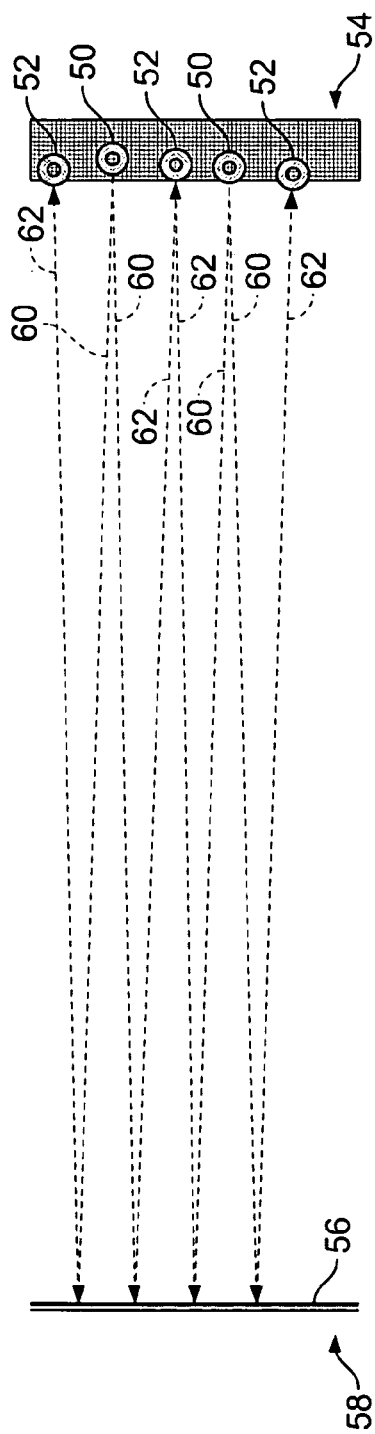
FIG. 4 is a top plan view of a portion of the imaging system of FIG. 1 configured as a nuclear medicine imaging system illustrating a proximity sensor arrangement in accordance with an embodiment of the invention.

Various embodiments of the invention provide methods and systems for controlling the positioning of imaging components of an imaging system. More particularly, as shown in FIG. 1, an imaging system 20 is provided that generally includes an imaging portion 22 and a processing portion 24. The imaging system 20 may be, for example, a nuclear medicine imaging system, or other medical imaging system, such as a computed-tomography (CT) system, single photon emission computed tomography (SPECT) system, positron emission tomography (PET) system, among others. It should be noted that the various embodiments are not limited to medical imaging systems or imaging systems for imaging human subjects, but also may be provided as non-medical systems and for imaging non-human objects, for example, non-destructive testing systems, etc.

In various embodiments, the imaging portion 22 includes a controller 26 connected to an imaging component 28 and an imaging component 30. The imaging components 28 and 30 are configured to image an object, such as, for example a human subject 32 in any known manner. The controller 26 is configured to control the operation of the imaging components 28 and 30 in any known manner, and for example, based on the type of imaging to be performed. The controller 26 may control, for example, the positioning and activation (e.g., data acquisition) of the imaging components 28 and 30. This control may include, for example, controlling the rotation of a gantry (not shown) supporting the imaging components 28 and 30. The processing portion 24 includes a processor 34 connected to a memory 36. The processor 34 also is connected to a user input 38 and a display 40. The processor 34 is configured to process acquired data from the imaging components 28 and 30 to generate an image of the subject 32 for display on the display 40 in any known manner.

In the various embodiments, the imaging system 20 is a nuclear medicine imaging system. When configured as a nuclear medicine imaging system, the imaging components 28 and 30 are configured as first and second gamma cameras. When configured for different applications, the imaging components 28 and 30 may be configured as different types of detectors. Also, the imaging components 28 and 30 may be provided in different configurations, for example, in H-mode and L-mode configurations as are known. In particular, FIG. 2 shows the imaging components 28 and 30 in an H-mode configuration and FIG. 3 shows the imaging components 28 and 30 in an L-mode configuration. In these embodiments, the imaging components 28 and 30, which are configured as gamma cameras, are mounted on a gantry 42 for rotation about an axis 44. A support table (not shown) for a patient (not shown) is positioned within an imaging area 46 that is in the field of view of the imaging components 28 and 30.

In operation, a subject being imaged, for example, a patient is maintained a distance away from the surface of the imaging components 28 and 30 to reduce or eliminate "missing data" that causes artifacts in the reconstructed image.

Figure 5:
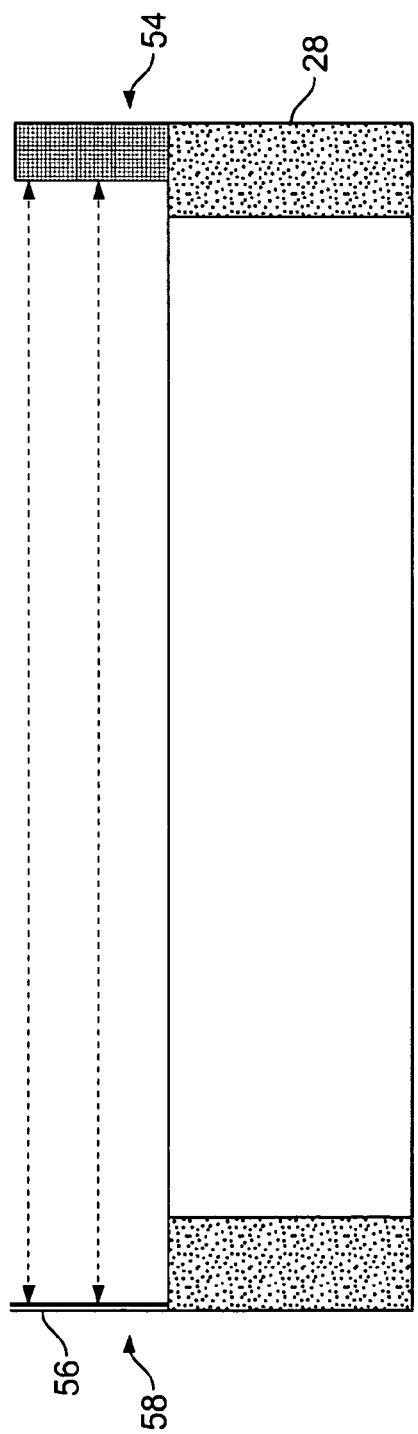
FIG. 5 is a side elevation view of the portion of the imaging system shown in FIG. 4.

Various embodiments of the invention provide different proximity sensors and configurations of proximity sensors for the imaging system 20. In particular, FIG. 4 is a top plan view of a portion of the imaging system 20 configured as a nuclear medicine imaging system. FIG. 5 is a side elevation view of a portion of the imaging system 20. In this embodiment, and the embodiments shown in FIGS. 5 through 8, the imaging system 20 is configured in an H-mode with only the imaging component 28 shown, which in this embodiment is a gamma camera detector. The configuration for the other imaging component 30, although not shown, is the same. The imaging system 20 includes a reflective proximity sensor arrangement including a plurality of light emitters 50 and light detectors 52 on a first end 54 at a front or top surface of the imaging component 28 and a reflector 56 on a second end 58 of the imaging component 58 at the front or top surface of the imaging component 28. For example, the first end 54 and second end 58 may be opposite sides of the imaging component 28. It should be noted that the imaging components 28 create detector dead zones 29 resulting in missing data in the region 31.

The light emitters 50 may be any suitable type of light source, for example, light emitting diodes (LEDs) and the light detectors 52 may be any suitable type of light detecting device, for example, photodiodes. Further, the light emitters 50, in an exemplary embodiment, are each one or more rows of LEDs. Additionally, the reflector 56 may be any suitable type of reflective surface, for example, a mirror, collection of mirrors, collection of optically structured reflectors, etc. The plurality of light emitters 50 and light detectors 52 may be configured as a single unit and the reflector 56 as another single unit. The number and arrangement of light emitters 50 and light detectors 52 may be modified as desired or needed. For example, the number of light emitters 50 and light detectors 52 may be increased or decreased. Additionally, the light emitters 50 and light detectors 52 may be arranged in an alternating arrangement, or for example, may be arranged two light emitters 50 between a pair of light detectors 52, two light detectors 52 between a pair of light emitters 50, etc. Further, although one row of LEDs and photodiodes are shown, this is for illustrative purposes only, and additional LEDs and photodiodes, and row thereof may be provided.

In operation, light waves 60 are emitted by the light emitters 50, and reflected by the reflector 56 to the light detectors 52 as reflected light waves 64. The optical paths of the light waves 60 and reflected light waves 62 are shown as arrows. The light waves 60 may be emitted in an angled alignment as shown in FIG. 4. Further, more than one light wave 60 may be emitted from each light emitter 50 and more than one reflected light wave 62 from one or more light emitters 52 may be received by each of the light detectors 52. It should be noted that the reflector 56 may be wavelength tuned such that the signal to noise ratio (SNR) is at a higher level. Further, the light emitters may be provided as LEDs having different wavelengths to reduce the likelihood of confusing optical paths. Other methods also may be used to distinguish between light waves emitted from different light emitters 50, for example, pulsing of LEDs and/or gating the photodiodes in any known manner.

Figure 6:
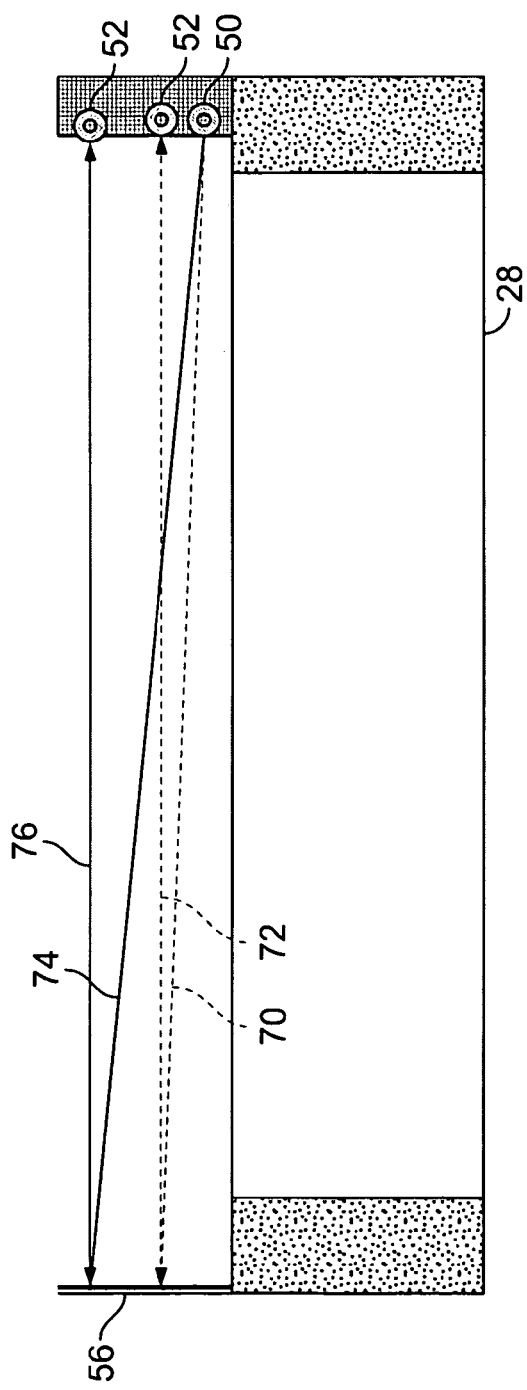
FIG. 6 is a side elevation view of a portion of the imaging system of FIG. 1 configured as a nuclear medicine imaging system illustrating a proximity sensor arrangement in accordance with another embodiment of the invention.
Figure 7:
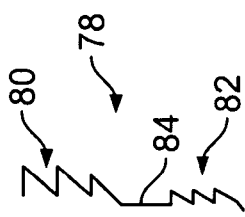
FIG. 7 is a side elevation view of a reflector for the imaging system of FIG. 1 constructed in accordance with an embodiment of the invention.

In another embodiment, as shown in FIG. 6, a single light emitter 50, which may include a single row of LEDs, is provided with a plurality of light detectors 52. In this embodiment, the reflector 56 includes a surface that allows the light waves from the light emitter 50 to be reflected to different light detectors 52, as illustrated by light waves 70 and 72, and 74 and 76, respectively. For example, the reflector 56 may be configured having a curved, tilted or structured surface 78 as shown in FIG. 7. For example, a first reflective angled arrangement 80 and a second reflective angled arrangement 82 having a different angle or shape are separated by a non-reflective section 84. It should be noted that the shaped reflector shown in FIG. 7 may be used in any of the various embodiments of the invention. Further, various and modifications to the shaped reflector are contemplated. For example, the reflector may include different shaped elements such as a mirrored corner cube. Additionally or alternatively, the shaped reflector may be manufactured by holographic methods.

Figure 8:
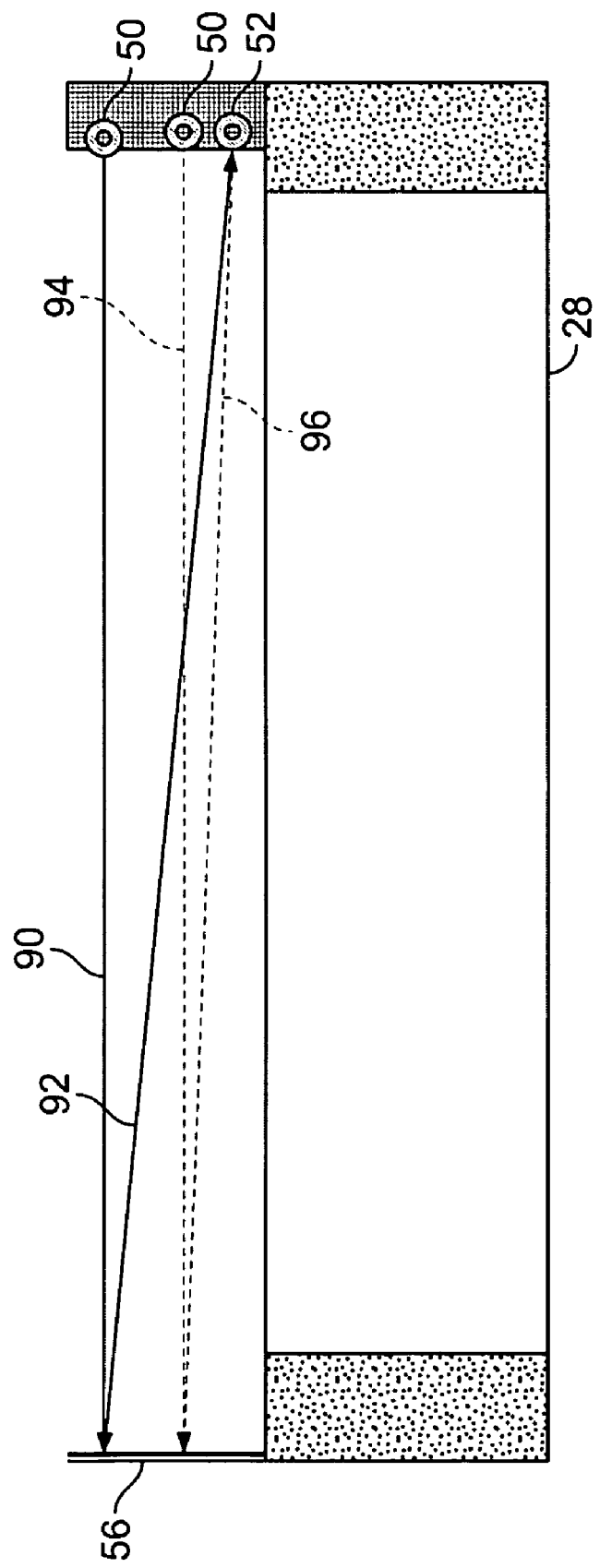
FIG. 8 is a side elevation view of a portion of the imaging system of FIG. 1 configured as a nuclear medicine imaging system illustrating a proximity sensor arrangement in accordance with another embodiment of the invention.

In another embodiment, as shown in FIG. 8, a plurality of light emitters 50, each of which may be a row of LEDs, is provided with a single light detector 52. In this embodiment, the reflector 56 also may include a surface that allows the light waves from the light emitters 50 to be reflected to the single light detector 52, as illustrated by light waves 90 and 92, and 94 and 96, respectively. Alternatively, each row of LEDs may be configured (e.g., aimed or directed) to be reflected to the single light detector 52.

Figure 9:
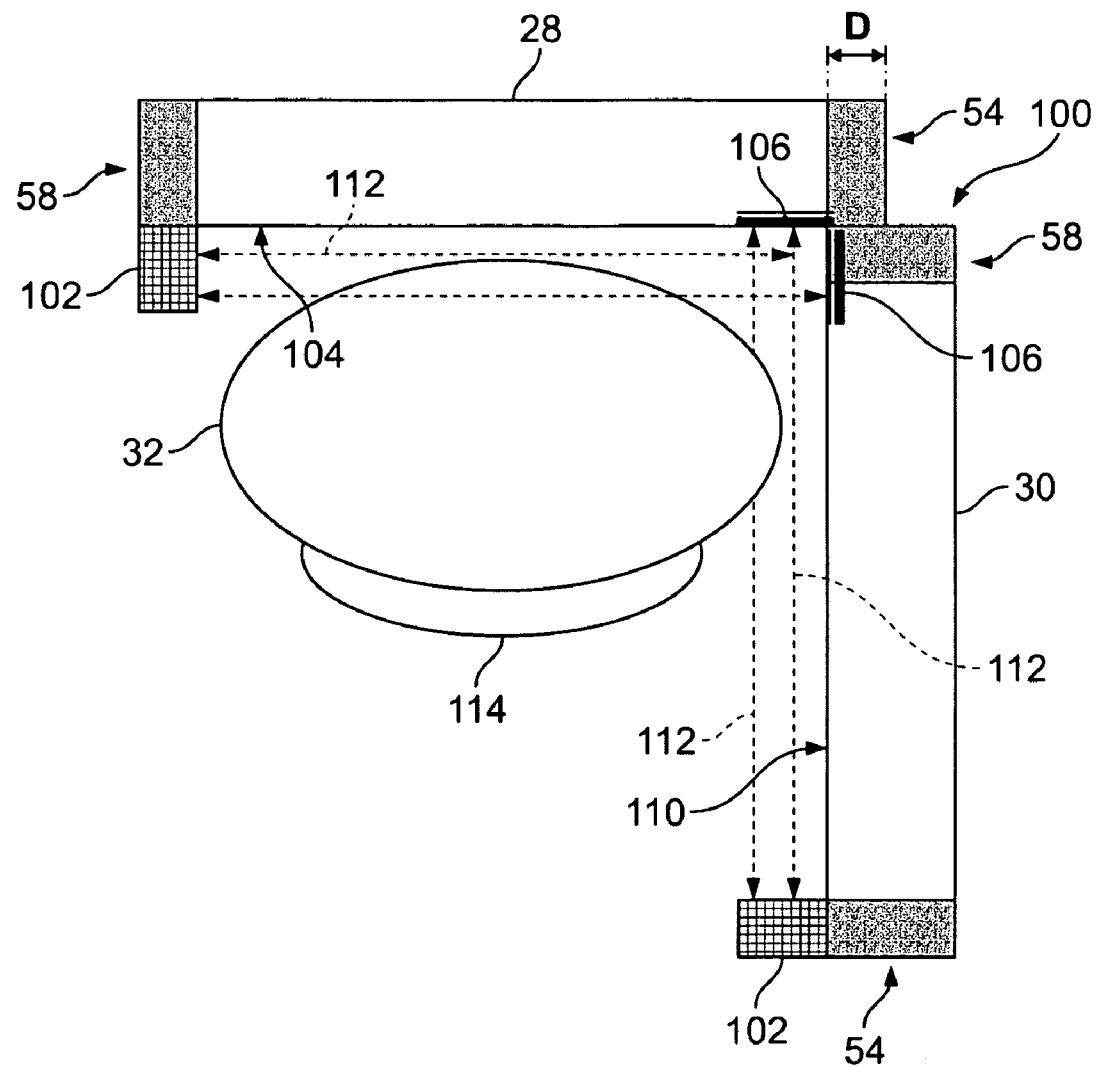
FIG. 9 is a side elevation view of a portion of the imaging system of FIG. 1 configured as a nuclear medicine imaging system illustrating a proximity sensor arrangement in accordance with another embodiment of the invention.

In another embodiment, as shown in FIG. 9, the imaging system 20 is shown in an L-mode configuration wherein a portion of the first end 54 of the imaging component 28 overlaps and engages a portion of the second end 58 of the imaging component 30 at a corner region 100. In this embodiment, the imaging component 28 includes a light emitter unit 102 (that may include a plurality of light emitters) extending from the second end 58 perpendicular to a top or front surface 104 of the imaging component 28 and a reflector 106 on the top surface 104 of the imaging component 28 located a distance D from the first end 54. The distance D, in one embodiment, is the same as the amount of overlap between the first end 54 of the imaging component 28 and the second end 58 of the imaging component 30. The reflector 106 is provided along the top surface 104 (e.g., parallel to the top surface 104). The reflector 106 may be constructed of any reflective material, and in one embodiment, is formed of a gamma transparent material. For example, the reflector 106 may be a thin, gamma transparent coating of aluminum foil.

In this embodiment, the imaging component 30 includes a light emitter unit 102 (that may include a plurality of light emitters) extending from the first end 54 perpendicular to a top or front surface 110 of the imaging component 30 and a reflector 106 on the top surface 110 of the imaging component 30 at the second end 58. The reflector 106 is provided along the top surface 110 (e.g., parallel to the top surface 104) and extends inward from the second end 58 a distance, for example, about equal to the distance the light emitter unit 102 extends from the second end 58 of the imaging component 28. The reflectors 106 of each of the imaging components 28 and 30 in this embodiment are configured in a perpendicular arrangement in abutting engagement at the corner 100.

In operation, light waves 112 are projected between the light emitter unit 102 and reflector 106 as illustrated by the arrows in FIG. 9. The light waves 112 may be emitted and reflected as described above with respect to FIGS. 4 through 8. As can be seen from FIG. 9, the configuration allows the subject 32 supported by, for example, a table 114 to be moved in close proximity to each of the imaging components 28 and 30. For example, the controller 26 (shown in FIG. 1) may move the subject 32 until the subject 32 is positioned such that the light wave 112 farther from the imaging components 28 and 30 is blocked and the light wave 112 closer to the imaging components 28 and 30 is not blocked by the patient 32.

Figure 14:
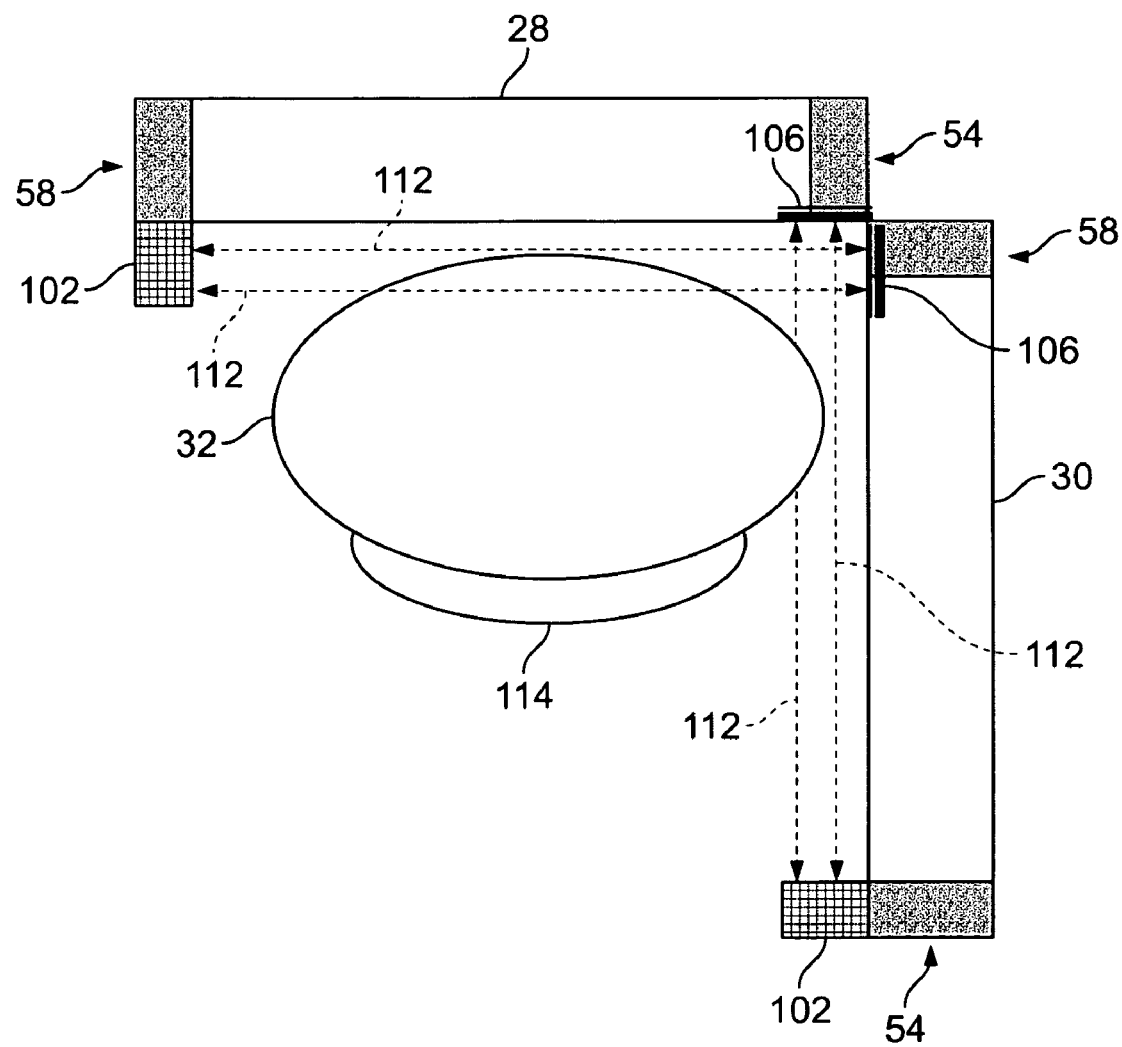
FIG. 14 is a side elevation view of a portion of the imaging system of FIG. 1 configured as a nuclear medicine imaging system in an L-mode configuration illustrating a proximity sensor arrangement in accordance with another embodiment of the invention.

In various embodiments, the light emitter units 102 and reflectors 106 are configured for operation with the imaging system 20 in both an H-mode configuration and an L-mode configuration. For example, the imaging system 20 may be capable of switching between an H-mode configuration used for a bone scan and the L-mode configuration used for a cardiac scan. In this embodiment, as shown in FIGS. 10 and 11, one or both of the reflectors 106 are configured for folding operation (e.g., configured in pivoting arrangement) such that in an unfolded state shown in FIG. 10, the reflector 106 is provided perpendicular to the top surface 104 of the imaging component 30 for H-mode operation and in a folded state shown in FIG. 11, the reflector 106 is provided parallel to the top surface 104 of the imaging component 30 for L-mode operation as shown in FIG. 14.

Figure 12:
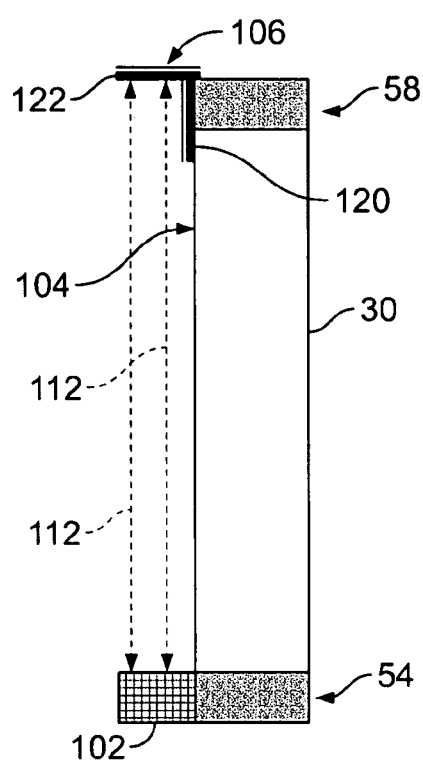
FIG. 12 is a side elevation view of a portion of the imaging system of FIG. 1 configured as a nuclear medicine imaging system in an H-mode configuration illustrating a proximity sensor arrangement in accordance with another embodiment of the invention.
Figure 13:
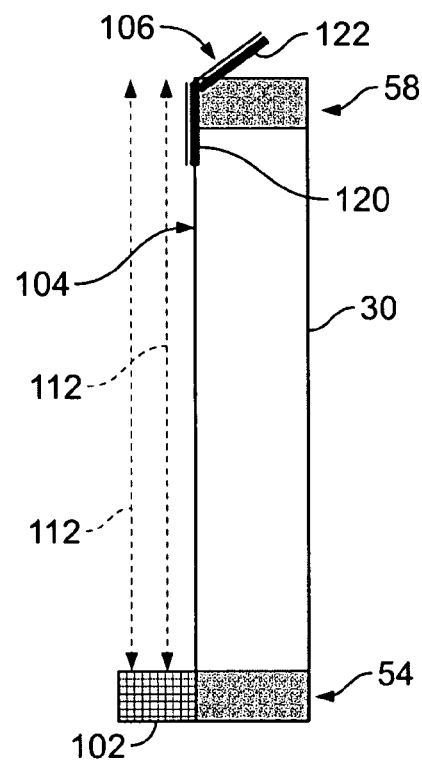
FIG. 13 is a side elevation view of a portion of the imaging system of FIG. 1 configured as a nuclear medicine imaging system in an L-mode configuration illustrating a proximity sensor arrangement in accordance with another embodiment of the invention.
Figure 15:
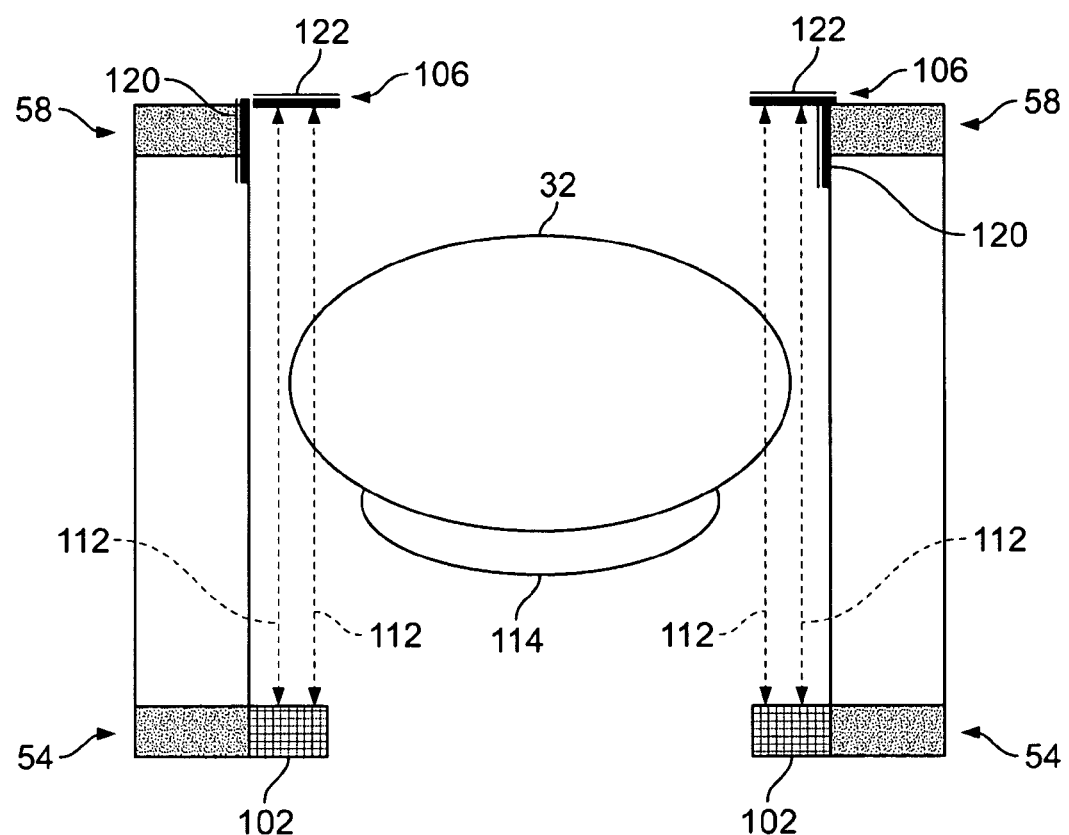
FIG. 15 is a side elevation view of a portion of the imaging system of FIG. 1 configured as a nuclear medicine imaging system in an H-mode configuration illustrating a proximity sensor arrangement in accordance with another embodiment of the invention.
Figure 16:
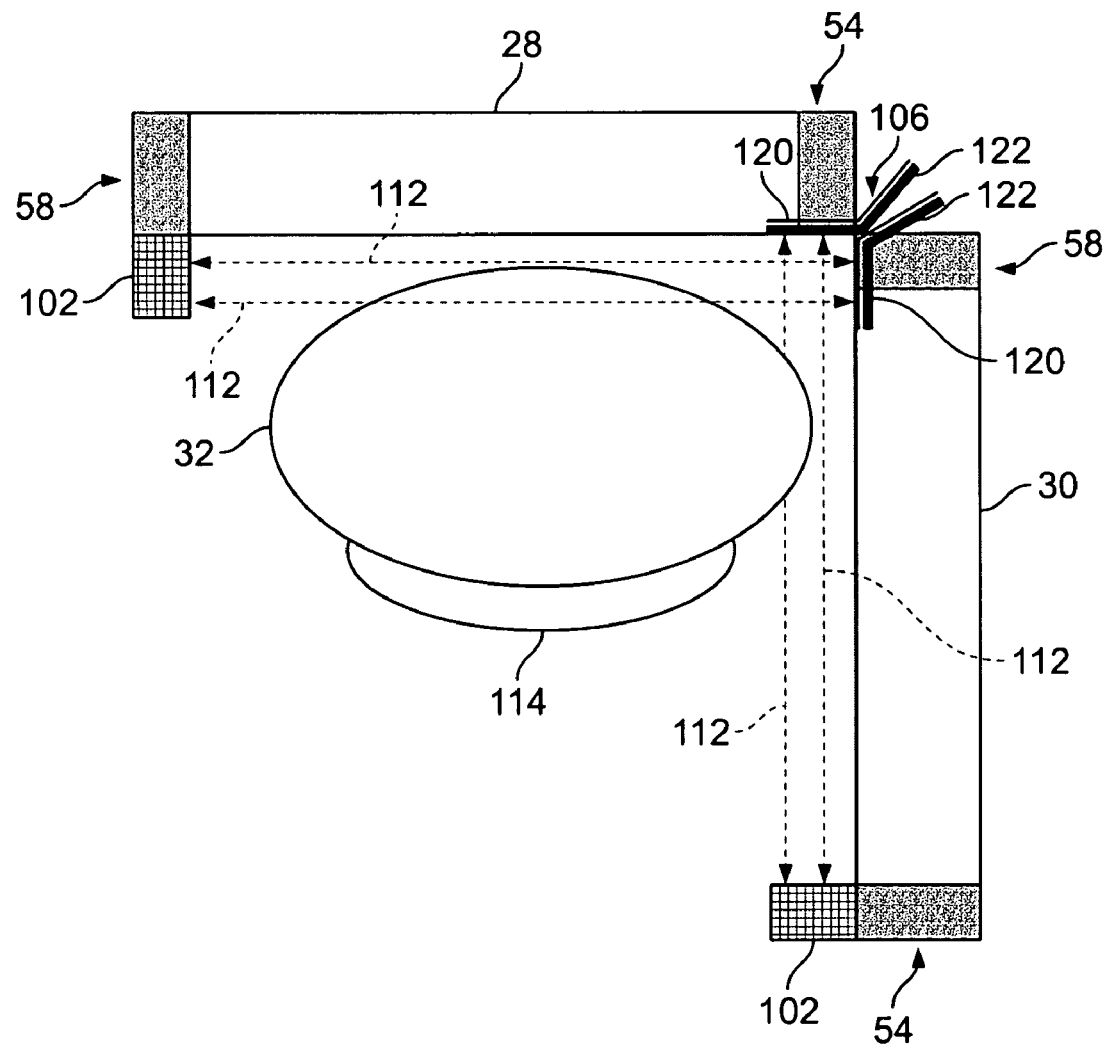
FIG. 16 is a side elevation view of a portion of the imaging system of FIG. 1 configured as a nuclear medicine imaging system in an L-mode configuration illustrating a proximity sensor arrangement in accordance with another embodiment of the invention.

In another embodiment shown in FIGS. 12 and 13, the reflector 106 is configured as a folding mirror, having a first mirror 120 (e.g., fixed mirror) and a second mirror 122 configured in pivoting arrangement to provide folding operation. In this embodiment, the second mirror 122 is configured for folding operation (e.g., configured in pivoting arrangement) such that in an unfolded state shown in FIG. 12, the first and second mirrors 120 and 122 are provided parallel and perpendicular to the top surface 104 of the imaging component 30, respectively, for H-mode operation as shown in FIG. 15. In a folded state shown in FIG. 13, the first mirror 120 is provided parallel to the top surface 104 of the imaging component 30 and the second mirror 120 provided in a folded position (e.g., folded such that no reflection is possible) for L-mode operation as shown in FIG. 16.

Figure 17:
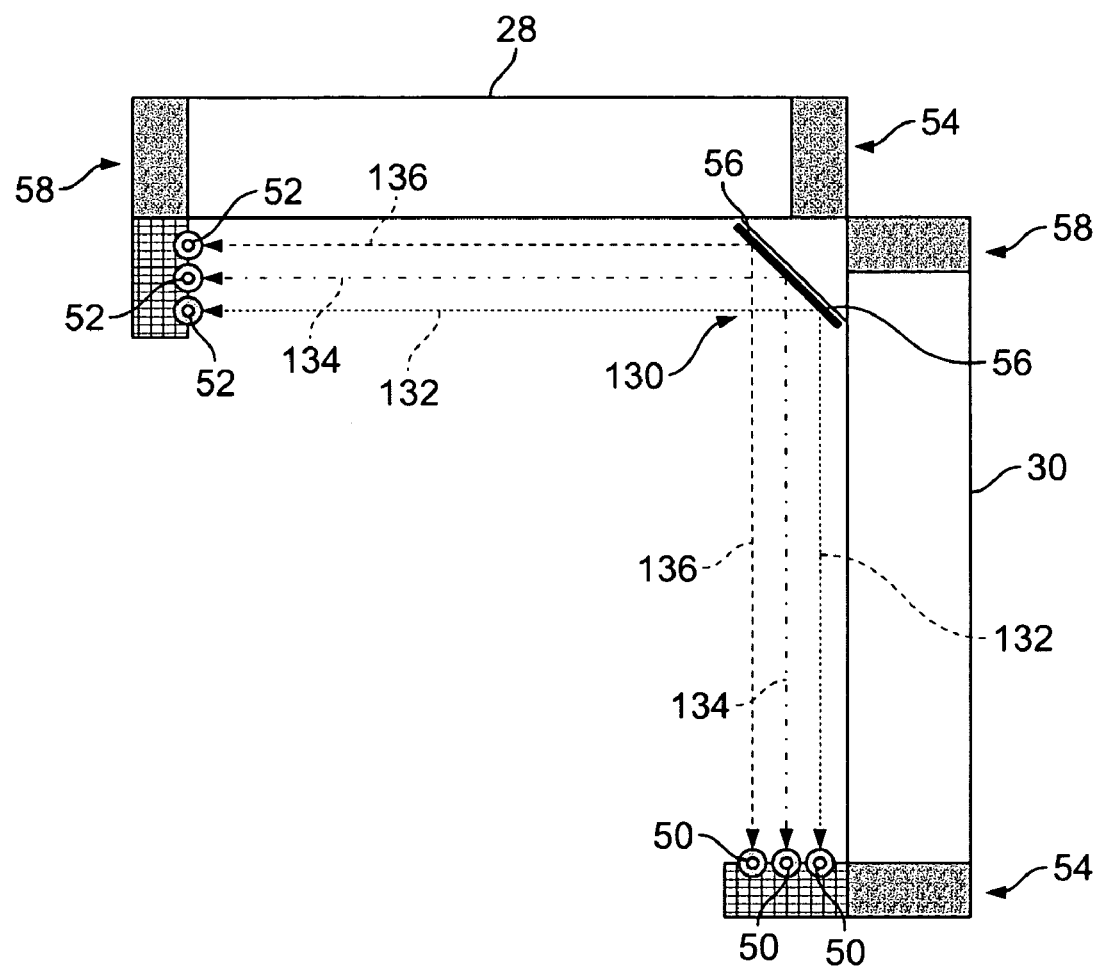
FIG. 17 is a side elevation view of a portion of the imaging system of FIG. 1 configured as a nuclear medicine imaging system in an L-mode configuration illustrating a proximity sensor arrangement in accordance with another embodiment of the invention.

Various embodiments also may be provided for use in imaging systems 20 having a fixed L-mode of operation, which may be used, for example, for cardiology scans. For example, as shown in FIG. 17, three light emitters 50 and three light detectors 52 are provided with an angled reflector 56 provided at a corner region 130 of the first end 54 of the imaging component 28 and the second end 58 of the imaging component 30. In this embodiment, a first light path 132, a second light path 134 and a third light path 136 are provided.

In this embodiment, the distance of an object (not shown), for example, a subject to be scanned, can be controlled based on the light paths 132, 134 and 136. For example, if none of light paths 132, 134 and 136 are blocked, then the imaging components 28 and 30 are too far from the object and either the imaging components 28 and 30, object or both are moved such that the object is closer to the imaging components 28 and 30. If the light path 136 is blocked, the imaging component 30 is in acceptable proximity to the object and the imaging component 28 is too far from the object. In this state, the imaging component 28, object or both are moved such that the object is closer to the imaging component 28. If the light paths 134 and 136 are blocked, the imaging component 30 is too near the object and the imaging component 28 is too far the object. In this state, the imaging components 28 and 30, object or both are moved such the object is moved closer to the imaging component 28 and moved farther away from the imaging component 30. If all light paths 132, 132 and 136 are blocked, both imaging components 28 and 30 are too near the object. In this state, the imaging components 28 and 30, object or both are moved such that the object is farther away from the imaging components 28 and 30. If light paths 132 and 136 are blocked, both the imaging components 28 and 30 are at an acceptable or correct distance from the object to be imaged.

Figure 18:
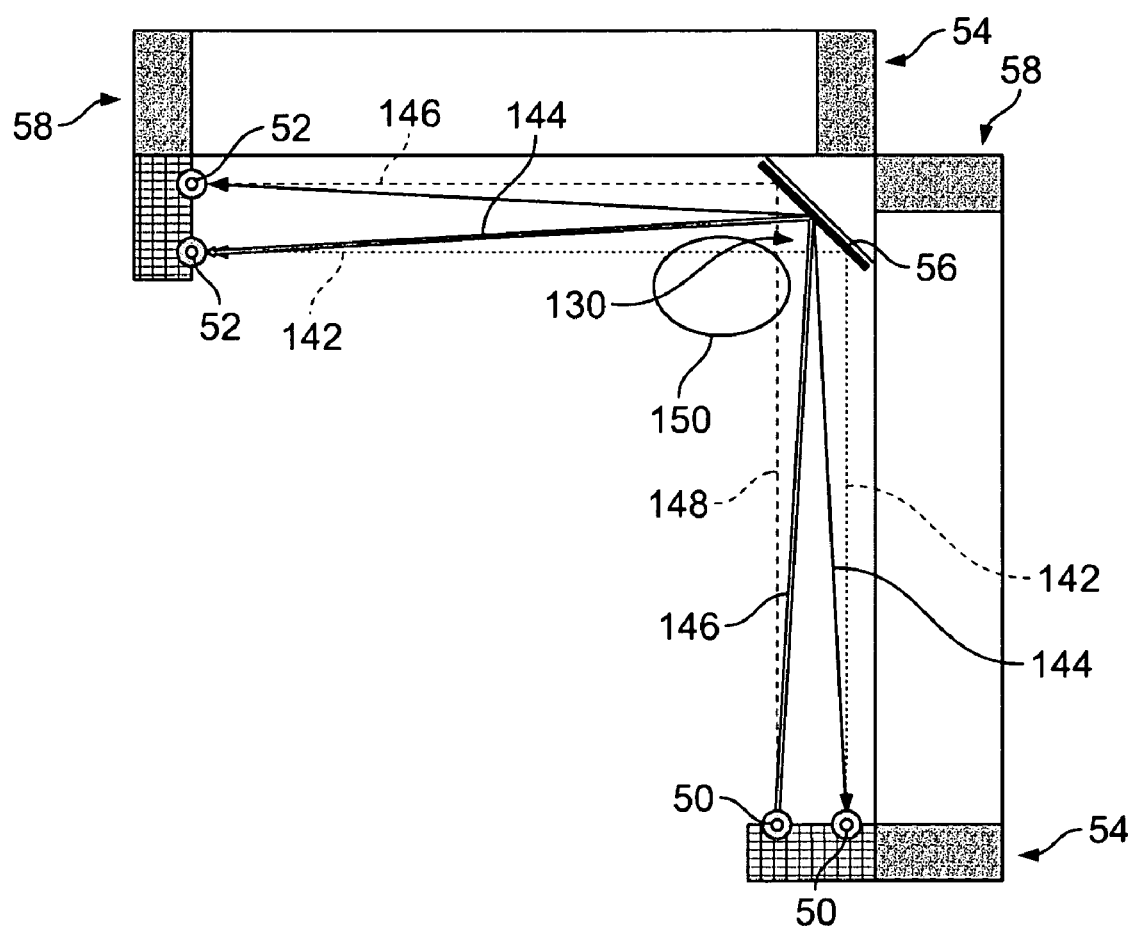
FIG. 18 is a side elevation view of a portion of the imaging system of FIG. 1 configured as a nuclear medicine imaging system in an L-mode configuration illustrating a proximity sensor arrangement in accordance with another embodiment of the invention.

As another example, as shown in FIG. 18, two light emitters 50 and two light detectors 52 are provided with the angled reflector 56 provided at the corner region 130 of the first end 54 of the imaging component 28 and the second end 58 of the imaging component 30. In this embodiment, a first light path 142, a second light path 144, a third light path 146 and a fourth light path 148 are provided. The light detectors 52 may be configured to emit light waves at different angles as described herein. Similar control states to the states described in FIG. 17 may be provided. For example, in this embodiment, when the light paths 142 and 148 are blocked, both the imaging components 28 and 30 are at an acceptable or correct distance from the object to be imaged.

Figure 19:
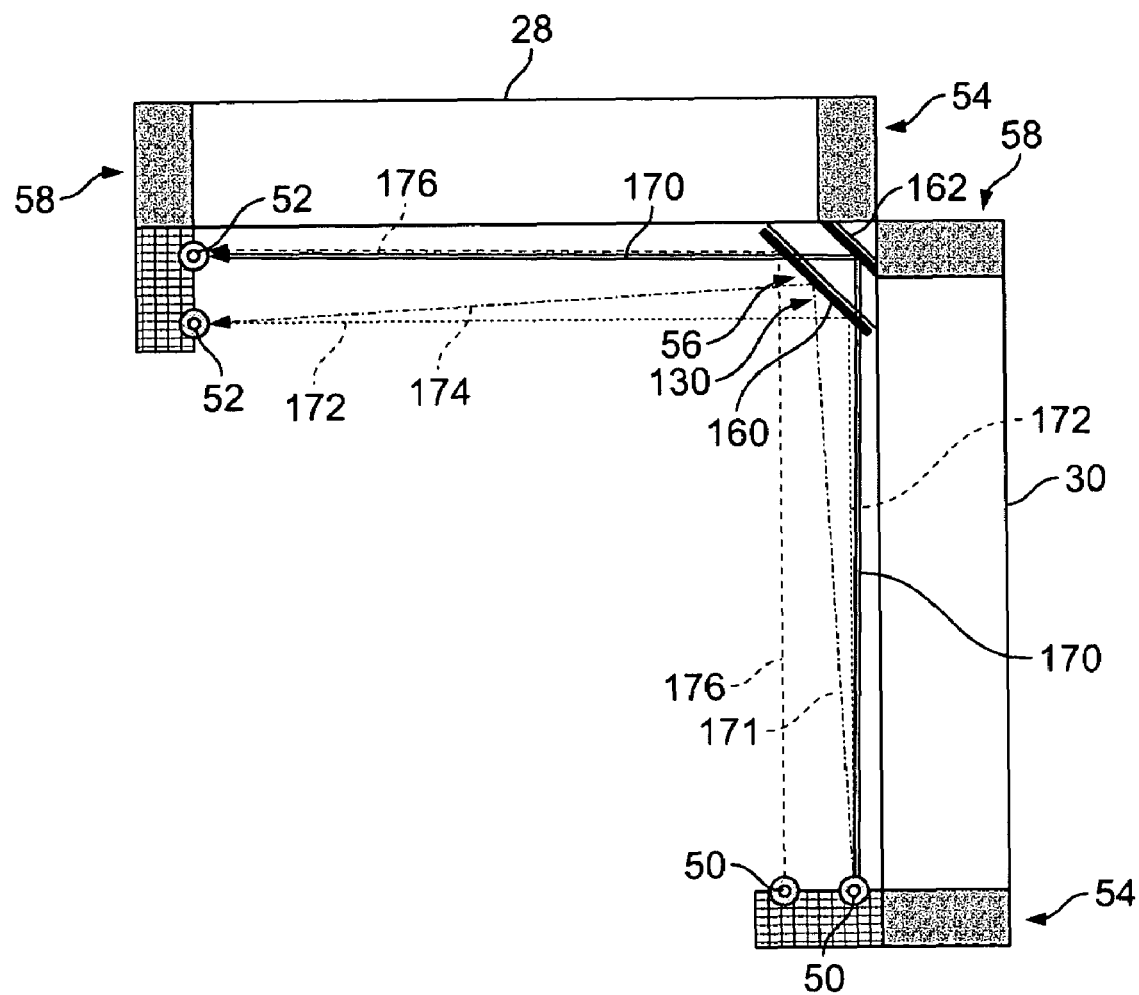
FIG. 19 is a side elevation view of a portion of the imaging system of FIG. 1 configured as a nuclear medicine imaging system in an L-mode configuration illustrating a proximity sensor arrangement in accordance with another embodiment of the invention.

As another example, as shown in FIG. 19, two light emitters 50 and two light detectors 52 are again provided with the angled reflector 56 at the corner region 130 of the first end 54 of the imaging component 28 and the second end 58 of the imaging component 30. In this embodiment, the angled reflector 56 includes a first mirror 160 (e.g., a front mirror) and a second mirror 162 (e.g., a back mirror). The first mirror 160 may include, for example, holes (not shown) to allow certain light waves to pass through to the second mirror 162. In alternative embodiment, the light waves reflected by the second mirror 162 may be provided at a different wavelength than the light waves reflected by the first mirror 160 and a selective reflector or beam splitter provided. Also, as another alternative, diffractive or holographic elements may be provided. Further, a structured mirror may be provided that is partially reflective. It should be noted that other structures or arrangements may be provide as desired or needed.

In this embodiment, a first light path 170, a second light path 172, a third light path 174 and a fourth light path 176 are provided. In this embodiment, the distance of an object (not shown), for example, a subject to be scanned, can be controlled based on the light paths 170, 172, 174 and 176. For example, if only the light path 172 is blocked, then the imaging components 28 and 30 are too far from the object and either the imaging components 28 and 30, object or both are moved such that the object is closer to the imaging components 28 and 30. If only the light path 170 is blocked, at least one of the imaging components 28 and/or 30 are too near the object. In this state, at least one of the imaging components 28 and 30, the object or both are moved such that the object is farther from at least one of the imaging components 28 and 30. If the light paths 174 and 176 are blocked, and the light path 170 is not blocked, the imaging components 28 and 30 are at an acceptable or correct distance from the object to be imaged. If the light path 176 is blocked and the light paths 170 and 174 are not blocked, the imaging component 30 is at an acceptable or correct distance from the object and the imaging component 28 is too far from the object. In this state, the imaging component 28, the object or both are moved such that the object is closer to the imaging component 28. It should be noted that other combinations and states are possible and in general, the imaging components 28 and 30 are moved in proximity to the object such that the one or two light paths farthest from the front surface 104 of the imaging component 28 or 30 are blocked and the one or two light paths closest to the front surface 104 of the imaging component 28 or 30 are not blocked.

It should be noted that the distance between the various components may be modified, for example, to provide different distance between light waves. For example, in various embodiments, the light waves generate a sheet of light that is about 50 centimeters wide and about 40 centimeters axially.

It is contemplated that the benefits of the various embodiments of the present invention accrue to all imaging systems, such as, for example, but not limited to, nuclear medicine imaging systems, PET, SPECT and dual-modality imaging systems.

Technical effects of the various embodiments of systems and methods described herein include providing imaging in closer proximity to an object, reducing the amount of missing data during L-mode imaging and reducing the cost of imaging sensors for imaging sensors providing H-mode and/or L-mode imaging.

Exemplary embodiments of imaging systems are described above in detail. The imaging system components illustrated are not limited to the specific embodiments described herein, but rather, components of each imaging system may be utilized independently and separately from other components described herein. For example, the imaging system components described above may also be used in combination with other imaging systems.

While the invention has been described in terms of various specific embodiments, those skilled in the art will recognize that the various embodiments of the invention can be practiced with modification within the spirit and scope of the claims.

What is claimed is:

1. A proximity sensor arrangement for an imaging system, said proximity sensor arrangement comprising:
    at least one light emitter;
    at least one light detector; and
    at least one reflector configured to reflect light waves from the at least one light emitter to the at least one light detector to form at least one light path to determine a proximity to at least one imaging component of the imaging system, and wherein the at least one reflector is perpendicular to a front surface of the at least one imaging component and the at least one light emitter and the at least one light detector are positioned on the same side of the at least one imaging component when the imaging system is provided in an H-mode configuration.

2. A proximity sensor arrangement in accordance with claim 1 wherein the at least one reflector is positioned on an opposite side of the at least one imaging component.

3. A proximity sensor arrangement in accordance with claim 1 wherein the at least one light emitter comprises a plurality of light emitting diodes (LEDs).

4. A proximity sensor arrangement in accordance with claim 3 wherein the LEDs are configured in rows.

5. A proximity sensor arrangement in accordance with claim 1 wherein the at least one light detector comprises a photodiode.

6. A proximity sensor arrangement in accordance with claim 1 wherein the at least one light emitter is configured to emit at least two different light waves.

7. A proximity sensor arrangement in accordance with claim 1 further comprising a plurality of light emitters, at least two of the light emitters emitting light waves at different wavelengths.

8. A proximity sensor arrangement in accordance with claim 1 wherein the at least one reflector comprises one of a mirror, a plurality of mirrors and a plurality of optically structured reflectors.

9. A proximity sensor arrangement in accordance with claim 1 wherein the at least one reflector is wavelength tuned.

10. A proximity sensor arrangement in accordance with claim 1 further comprising a plurality of light paths configured to determine when the imaging component is one of too close to an object to be imaged, too far from the object and at an acceptable distance from the object.

11. A proximity sensor arrangement in accordance with claim 1 wherein the at least one reflector is configured to reflect light waves from the at least one light emitter to different light detectors.

12. A proximity sensor arrangement in accordance with claim 1 wherein the at least one imaging component comprises a gamma camera detector.

13. A proximity sensor arrangement in accordance with claim 1 wherein the at least one imaging component includes an imaging surface having at least two substantially opposing sides.

14. A proximity sensor arrangement for an imaging system, said proximity sensor arrangement comprising:
    at least one light emitter;
    at least one light detector; and
    at least one reflector configured to reflect light waves from the at least one light emitter to the at least one light detector to form at least one light path to determine a proximity to the at least one imaging component of the imaging system and wherein the at least one light emitter and the at least one light detector are positioned on opposite sides of two different imaging components with the at least one reflector therebetween when the imaging system is provided in an L-mode configuration.

15. A proximity sensor arrangement in accordance with claim 14 wherein the at least one reflector comprises a first mirror in front of a second mirror.

16. A proximity sensor arrangement in accordance with claim 14 wherein the at least one reflector comprises an angled mirror positioned at a corner region between the two different imaging components.

17. A proximity sensor arrangement for an imaging system, said proximity sensor arrangement comprising:
    at least one light emitter;
    at least one light detector; and
    at least one reflector configured to reflect light waves from the at least one light emitter to the at least one light detector to form at least one light path to determine a proximity to the at least one imaging component of the imaging system and wherein the at least one reflector is configured for folding operation.

18. A proximity sensor arrangement in accordance with claim 17 wherein the at least one reflector operates in an L-mode configuration when in a folded state and an H-mode configuration when in an unfolded state.

19. A nuclear medicine imaging system comprising:
    a first gamma camera detector;
    a second gamma camera detector; and
    a proximity sensor connected to each of the first and second gamma cameras, the proximity sensor including a reflector configured to reflect light waves to determine the proximity of the first and second gamma cameras from an object to be imaged and wherein the proximity sensor comprises at least one light emitter and at least one light detector, the at least one light emitter and at least one light detector positioned on the same side of each of the first and second gamma cameras when in an H-mode configuration, and the at least one light emitter and at least one light detector positioned on opposite sides of the first and second gamma cameras when in an L-mode configuration.

20. A nuclear medicine imaging system in accordance with claim 19 wherein the at least one reflector comprises at least one mirror being one of fixedly or pivotally connected to each of the first and second gamma cameras.

21. A method of controlling the positioning of imaging components of a medical imaging system, said method comprising:
    emitting light waves from a first side of a first imaging component;
    reflecting the emitted light waves to one of the first side of the first imaging component or a second side of a second imaging component;
    positioning the first and second imaging components based on whether the light waves are blocked or unblocked; and
    moving a reflector that reflects the emitted light waves, the movement based on the mode of operation of the medical imaging system.

22. A method in accordance with claim 21 further comprising pulsing the light waves.

23. A method in accordance with claim 21 further comprising emitting the light waves at different wavelengths.

24. A method in accordance with claim 21 further comprising tuning the wavelength reflectivity of the reflected light waves.

25. An optical light path generated within a medical imaging system, said optical light path comprising:
- a plurality of emitted light waves, at least two of the plurality of emitted light waves emitted at different angles from a light emitter on a side of an imaging component of the medical imaging system; and
- a plurality of reflected light waves detected by at least one light detector on the side of the imaging component having the light emitter, wherein the emitted light waves and the reflected light waves are configured to determine a proximity of an imaging component of the medical imaging system to an object to be imaged.

26. An optical light path in accordance with claim 25 wherein the reflected light wave is reflected in one of a direction generally opposite the emitted light wave and at an angle.

27. A proximity sensor arrangement for an imaging system, said proximity sensor arrangement comprising:
- at least one light emitter;
- at least one light detector; and
- at least one reflector configured to reflect light waves from the at least one light emitter to the at least one light detector to form at least one light path to determine a proximity to the at least one imaging component of the imaging system, wherein the at least one reflector is parallel to a front surface of the at least one imaging component.

* * * * *